Figure 1:
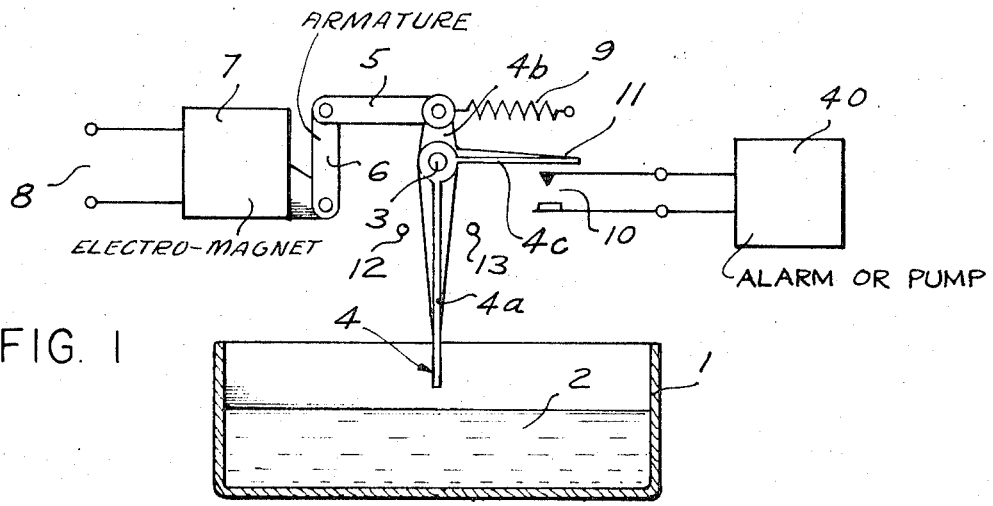

United States Patent [19]
Hartung

[11] 3,747,084
[45] July 17, 1973

[54] LIQUID LEVEL GAUGE

[75] Inventor: Winfried Hartung, Offenbach, Germany

[73] Assignee: Roland Offsetmaschienfabrik Faber & Schleicher AG, Offenbach am Main, Germany

[22] Filed: Mar. 11, 1971

[21] Appl. No.: 123,196

[52] U.S. Cl. .................... 340/244 R, 340/248 P
[51] Int. Cl. ............................................ G08b 21/00
[58] Field of Search ............................ 340/244 R

[56] References Cited
UNITED STATES PATENTS

| | | | |
|---|---|---|---|
| 3,287,720 | 11/1966 | Chambers | 340/244 R |
| 3,296,497 | 1/1967 | Slattery | 340/244 R |
| 3,368,213 | 2/1968 | Quinn | 340/244 R |

Primary Examiner—Thomas B. Habecker
Attorney—Hane, Baxley & Spiecens

[57] ABSTRACT

A liquid level gauge for supervising the level of a liquid such as the level in an ink receptacle of a printing press comprises a probe which is driven to perform repetitive uniform motions and so arranged that it dips into the ink when the level thereof exceeds a predetermined height. Dipping of the probe into the ink and the resulting increased resistance thus experienced by the probe cause the probe to vary the repeat pattern of its motions. This variation is utilized via switch means controlled by the probe motions to stop the feeding of ink into the receptacle thereby effectively preventing overfilling of the ink receptacle.

6 Claims, 2 Drawing Figures

2

LIQUID LEVEL GAUGE

The invention relates to a liquid level gauge, and more particularly to a liquid level gauge for supervising the level of ink in the ink receptacle of a printing press.

BACKGROUND

There are known liquid level gauges or level-detecting devices of the general kind above referred to, for instance from German Pat. No. 1,222,511, in which temperature-sensitive resistors are used. Such resistors will change their resistance upon dipping into the liquid to be supervised and this change is utilized to generate a control pulse. Liquid level gauges of this kind have the disadvantage that the resistors must be kept at a temperature above the ambient room temperature, and as a result the ink on the heads of the probes tends to dry out. Obviously, such drying-out of the ink reduces the operational reliability of the gauge.

THE INVENTION

It is a broad object of the invention to provide a novel and improved liquid level gauge of the kind above referred to which is simple and rugged in construction, is practically free of operational failures as it does not require heating of any component above the ambient room temperature, and is capable of reliably operating at any viscosity of the liquid such as ink, the level of which is to be supervised.

SUMMARY OF THE INVENTION

The afore-pointed out objects, features and advantages, and other objects, features and advantages which will be pointed out hereinafter are obtained by providing a pulse generator which is driven at a constant rate and is disposed above the liquid level to be supervised so that a probe part of the pulse generator dips into the liquid when the level thereof exceeds a predetermined value. Such dipping of the probe part of the pulse generator causes a mechanical braking of the speed of the pulse generator and thus a change in the pattern of the generated pulses such as a reduction of the frequency and/or the amplitude of the pulses. The change experienced by the pulses is utilized to generate an electric signal which, in turn, serves to activate an alarm means such as means for feeding ink into the receptacle when the level of the ink therein has dropped below the predetermined value.

According to a particularly advantageous structure the pulse generator includes a pendulum to which are imparted repititive uniform motions by a suitable driving means such as a pulse generator. The pendulum motions are utilized alternately to open and close switch contacts as a function of the pendulum motions. Dipping of a probe part of the pendulum into the liquid when the level thereof ex-ceeds a predetermined value causes a reduction of the pendulum motions and thus the desired variations of the generated pulses.

The pendulum assembly permits a very simple and rugged construction of the liquid level gauge.

It is further contemplated by the invention to feed the pulses as generated by the pulse generator to pulse integrating means which in response to a variation of the pulse frequency or to another change in the characteristics of the pulses operates a switch means. The operation of the switch means, in turn, activates the alarm means as previously described.

DETAILED SUMMARY OF THE INVENTION

In the accompanying drawing an embodiment of the invention is shown by way of illustration and not by way of limitation.

Figure 2:
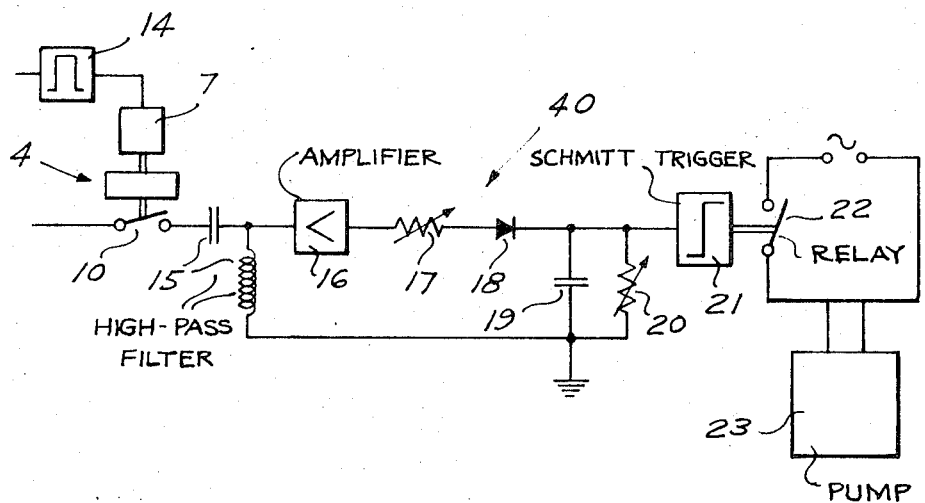

In the drawing:

FIG. 1 is a diagrammatic elevational view of a liquid level gauge according to the invention; and FIG. 2 is a diagram of a circuit system including the liquid level gauge of FIG. 1;

Referring now to the figures more in detail, the liquid level gauge exemplifed in FIG. 1 is shown as supervising the level of liquid 2 in a receptacle 1. This receptacle may be visualized as the ink receptacle or container of a printing press.

A pendulum 4 having three arms 4a, 4b and 4c in general star-like arrangement, is swingable about a pivot 3 disposed above the receptacle. The pendulum and more specifically its arm 4b, is coupled by a link 5 to an armature 6 of an electro-magnet or solenoid 7. This electro-magnet is presumed to be connected to a suitable power supply. A tension spring 9 stationarily held at one end and secured to arm 4b at its other end biases the pendulum in clockwise direction and energization of electro-magnet 7 turns the pendulum in counter-clockwise direction against the action of spring 9. The resulting pendulum motions are preferably limited by stops 12 and 13.

The swinging motions of the pendulum are utilized to operate a switch means 10, biased into its open position. As it is shown, turning of the pendulum in clockwise direction will cause closing of the switch means via arm 4c and turning of the pendulum in counter-clockwise direction will permit reopening of the switch means. The switch means is connected in circui with an alarm means which is diagrammatically indicated by block 40. This means may include audible or optical signal means of conventional design to alert personnel in charge of the press or, as will be more fully described hereinafter, it may turn on and off a pump for feeding liquid such as ink into receptacle 1.

When now electro-magnet 7 is energized at reqular intervals, switch means 10 when connected to a suitable circuit system to be described hereinafter, will generate a sequence or repeat pattern of uniform pulses in synchronism with the intermittent energization of electro-magnet 7 when and while pendulum arm 4a can swing freely above the level of the ink.

Assuming now that the liquid level reaches a height such that the tip of pendulum arm 4a dips into the liquid. Such engagement of the pendulum arm with the liquid will cause a corresponding mechanical braking or reduction of the pendulum movements, thereby correspondingly varying the pattern of the pulses generated by opening and closing of switch means 10. Depending upon the circuitry connected to the switch means the frequency and/or the amplitude of the pulses may be changed, but in any event there will be some change in the pulse pattern.

The extent to which the pendulum motions are reduced depends upon, of course, to a certain extent upon the depth of the immersion of the pendulum arm and also on the viscosity of the liquid. If the ink or otherliquid has a high viscosity, the pendulum may be stopped in an intermediate position in the liquid.

Turning now to the circuit diagram of FIG. 2. According to this figure electro-magnet or solenoid 7 is connected to a pulse generator such as an astable multivibrator 14 which energizes electro-magnet 7 at constant intervals. The pulses thus initiated by switch means 10 are fed through a high pass filter network 15, an amplifier 16, a variable resistor 17 and a rectifier 18, to a capacitor 19. This capacitor is connected to a suitable circuit component such as a conventional Schmitt-trigger 21 including a relay 22. This relay controls a pump 23 which should be visualized as being arranged to feed liquid into the receptacle 1. As is evident, capacitor 19 will integrate pulses until the charge of the capacitor is such that trigger 21 will operate a relay 22 which in turn will start pump 23.

As it is evident, charging of the capacitor to its discharge voltage presupposes that pulses are generated by switch means 10 at a given minimum repetition frequency, or inother words, that the liquid level is below or practically below the tip of pendulum arm 4a. When now the liquid level in receptacle 1 reaches a height causing braking of the pendulum motions, the repetition frequency of the pulses will drop below the required minimum speed. Accordingly, feed pump 3 will be stopped.

A timing means in the form of a variable resistor 20 is advantageously included in the circuit so that the discharge time of capacitor 19 can be selectively set. This has the advantage that pump 23 is not started in response to a short slowdown or even a short interruption of the pulse repetition pattern for any reasons. In other words, resistor 20 serves to prevent hunting or pulsating of the system.

As it is now evident from the previous description, pump 23 will automatically resume feeding ink into receptacle 1 whenever the liquid level therein sinks below the level at which the tip of arm 4a of the pendulum dips into the ink, as at that point the pendulum resumes its normal pattern of motions thereby restoring the normal pulse pattern.

While the invention has been described in detail with respect to a certain now preferred example and embodiment of the invention, it will be understood by those skilled in the art, after understanding the invention, that various changes and modifications may be made without departing from the spirit and scope of theinvention, and it is intended, therefore, to cover all such changes and moficiations in the appended claims.

What is claimed is:

1. A liquid level gauge for supervising the level of high viscosity ink, said level gauge comprising:

including a movable probe, intermittently activated drive means for positively imparting to said probe uniform repetitive swinging motions to an activated position, and return to a rest position, and switch means alternately opened and closed in synchronism with said motions of the probe, opening and closing of said switch means causing generation of corresponding repetitive pulses; and alarm means, circuit means connecting said switch means to said alarm means, for controlling said alarm means in response to said pulses, said probe being arranged to dip into the liquid when the level thereof exceeds a predetermined height thereby causing a change in the motions of the probe, said change in turn causing a change in the gneration of the pulses, said change being utilized by said circuit means to activate the alarm means when and while said change in the pulses persists, said probe comprising a pendulum pivotally supported near one end, another end of the pendulum dipping into the liquid when the level thereof exceeds said predetermined height, the motions imparted to the pendulum causing the same to swing from an initial rest position to a predetermined angularly deflected position and to return to its initial position at the end of each motion, dipping of said other end of the pendulum into the liquid varying said pendulum motions, and said switch means being operated by said pendulum motions so as to cause the generation of said pulses in conformity with the variations of the pendulum motions.

2. The liquid level gauge according to claim 1 wherein said pulse generating means include Schmitt trigger means for changing the pulses as to frequency per unit of time in response to said change in the motions of the probe.

3. The liquid level gauge according to claim 1 wherein said pendulum has three radial arms extending from a common pivot point, said drive means being coupled to one of said arms for imparting said motions to the pendulum, a second one of said arms coacting with said switch means for causing said opening and closing of the same by the pendulum motions and the third arm having said end arranged to be contacted by the liquid when the level thereof exceeds said predetermined height.

4. The liquid level gauge according to claim 1 wherein said alarm means comprise circuit control means responsive to a change in said pulses, said alarm means being controlled by said circuit control means.

5. The liquid level gauge according to claim 4 wherein said switch means and said circuit control means are connected in a circuit also including a discharge means, said discharge means blocking activation of said circuit control means by a change in the pulses unless said change persists for a predetermined minimum period of time.

6. The liquid level gauge according to claim 1 and comprising tension means coupled to said pendulum for biasing the same into one circumferential direction, said drive means driving the pendulum into the opposite circumferential di-rection.

* * * * *